(No Model.)

W. W. RINER.
FAUCET.

No. 485,430. Patented Nov. 1, 1892.

WITNESSES:
J. A. Bergstrom
C. Sedgwick

INVENTOR
W. W. Riner
BY Munn & Co
ATTORNEYS.

UNITED STATES PATENT OFFICE.

WILLIAM W. RINER, OF LOS ANGELES, CALIFORNIA.

FAUCET.

SPECIFICATION forming part of Letters Patent No. 485,430, dated November 1, 1892.

Application filed June 20, 1892. Serial No. 437,337. (No model.)

*To all whom it may concern:*

Be it known that I, WILLIAM W. RINER, of Los Angeles, in the county of Los Angeles and State of California, have invented a new and Improved Faucet, of which the following is a full, clear, and exact description.

The object of the invention is to provide a new and improved faucet which is simple and durable in construction, very effective in operation, easily manipulated, and more especially designed for use on sheet-metal cans and similar vessels.

The invention consists in certain parts and details and combinations of the same, as will be fully described hereinafter, and then pointed out in the claim.

Reference is to be had to the accompanying drawings, forming a part of this specification, in which similar letters of reference indicate corresponding parts in all the figures.

Figure 1:
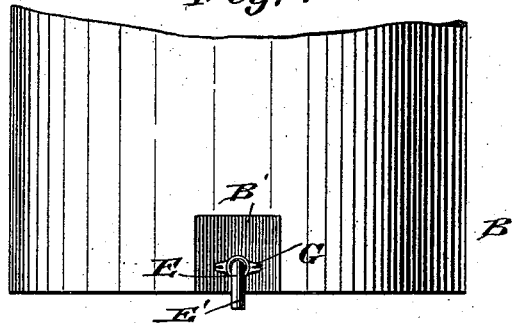
Figure 2:
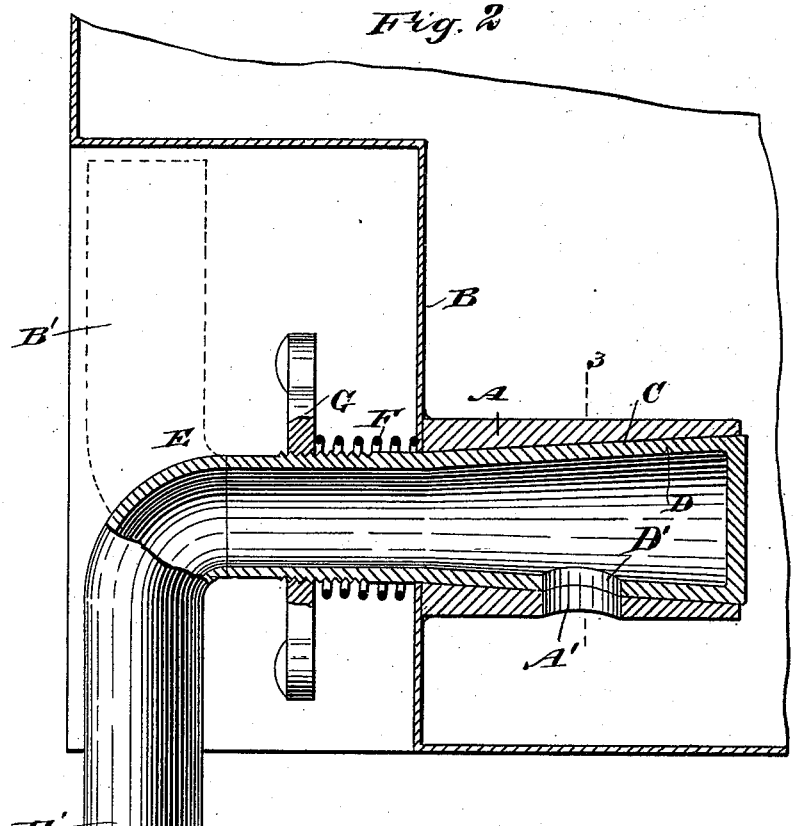
Figure 3:
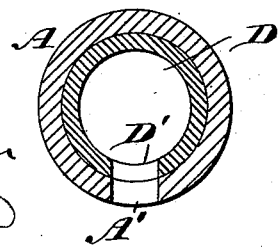
Figure 4:
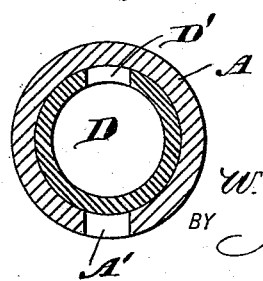

Figure 1 is a front elevation of the improvement as applied. Fig. 2 is an enlarged transverse section of the same. Fig. 3 is a cross-section of the same on the line 3 3 in Fig. 2, and Fig. 4 is a similar view of the same with the spout shut off.

The improved faucet is provided with a seat A, secured to the vessel B, preferably at the inside thereof, as is plainly illustrated in Fig. 2. The seat A is formed with a conical opening C, in which is fitted the correspondingly-shaped closed end D of the spout E, extending to the outside of the vessel B, and having its outer end preferably bent downward, as at E', as is plainly shown in Figs. 1 and 2. In the wall of the seat A is formed an aperture A', and a similar aperture D' is formed in the wall of the conical end D, the two apertures being arranged in alignment with each other and adapted to register when the exterior end E' of the spout extends downward, as shown in Fig. 2. When the spout E is turned so that the end E' extends upward, as shown in dotted lines in Fig. 2, then the aperture D' is disconnected from the aperture A', (see Fig. 4,) so that the liquid from the vessel cannot pass into the spout. When the two apertures register with each other, as shown in Figs. 2 and 3, then the liquid contained in the vessel can pass through the said apertures into the spout and out of the same through its downwardly-extending end E'. The conical end D of the spout E is held in its seat by the pressure of the liquid contained in the vessel B and exerted against the closed end of the said spout end D; but in order to very securely hold the conical end D on the seat A, I provide a spring F, which is coiled around the outer end of the spout E, and rests at one end against the outside of the vessel B and at its other end against the nut G, screwing on the threaded portion of the spout E. By screwing the nut G farther in the tension of the spring F is increased, and by screwing the said nut outward the tension of the spring F is diminished, so that the force with which the conical end D is held on the seat A can be regulated at the will of the operator. It is understood that the end E' of the spout is bent after the several parts are in place, or the said downwardly-turned end is soldered on separately after the several parts are in position.

As shown in Figs. 1 and 2, the outer end of the spout extends in a recess B', formed in the wall of the vessel B, so that the spout is perfectly protected, both in a lowermost or uppermost position, to prevent accidental turning of the spout.

As shown in Figs. 1 and 2, the end E' projects slightly below the bottom of the vessel at the time the apertures A' and D' register with each other, and the liquid flows from the vessel through the spout into a can or other receptacle held on the outer end E' of the spout E.

Having thus described my invention, I claim as new and desire to secure by Letters Patent—

The combination, with the vessel B, having a recess B' in its lower portion, said recess being open at its front and lower sides, of the faucet comprising a seat A, secured within the vessel and having a tapering bore and a lateral opening A', the angular spout E, the inner member of which is tapered to fit the seat A and provided with a lateral opening D', a nut G on the spout E, and a spring F between the nut and the rear wall of the recess B', the outer end E' of the spout being adapted to swing in the recess B' and of a length to extend below the lower end of the recess B', substantially as set forth.

WILLIAM W. RINER.

Witnesses:
 I. T. MARTIN,
 A. L. PARK.